No. 711,281. Patented Oct. 14, 1902.
G. BRYAN.
COMBINED METALLURGIC FURNACE AND PRECIPITATING WATER TANK.
(Application filed Sept. 23, 1899.)
(No Model.)
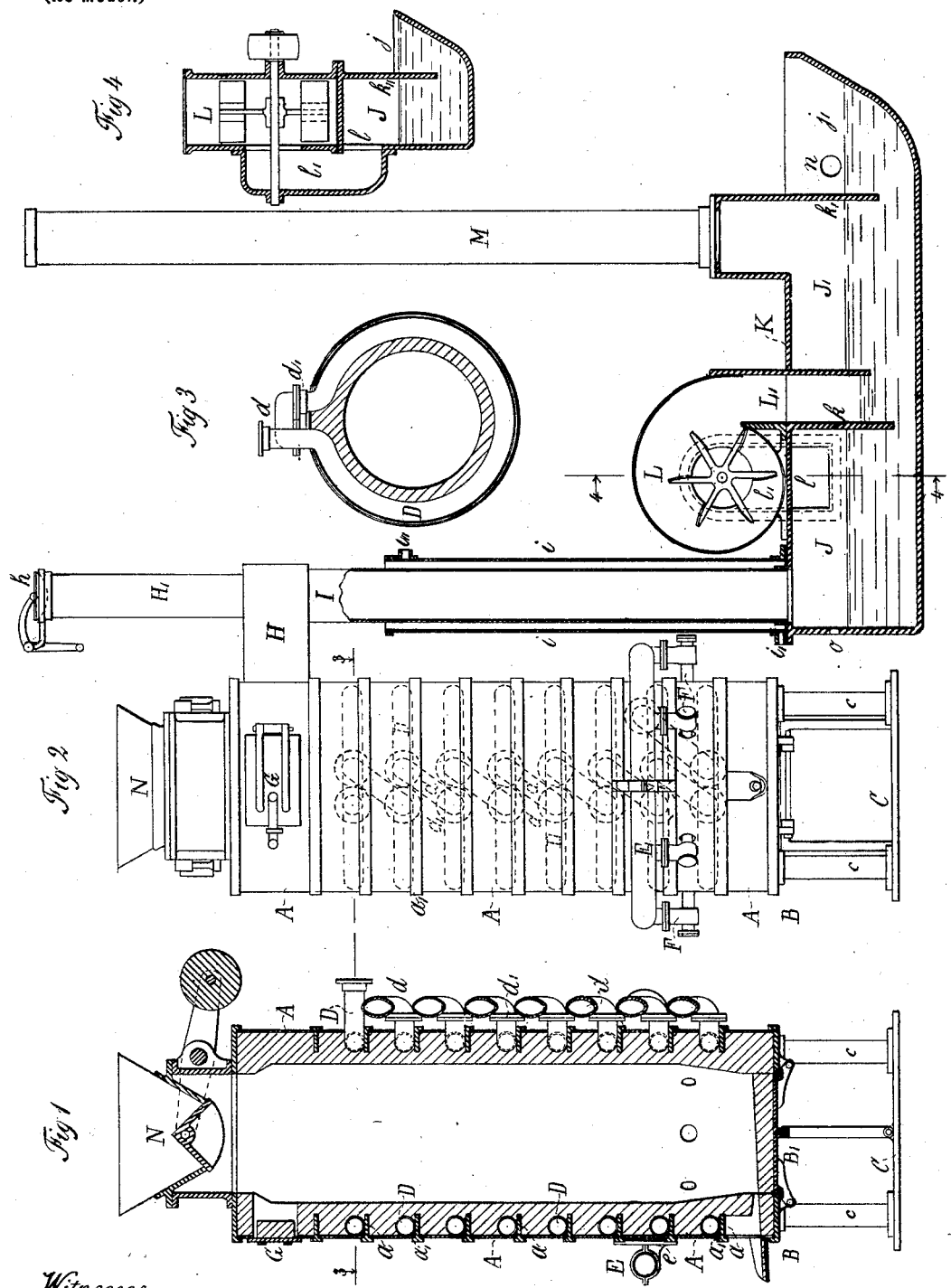

UNITED STATES PATENT OFFICE.

GUY BRYAN, OF ST. LOUIS, MISSOURI.

COMBINED METALLURGIC FURNACE AND PRECIPITATING WATER-TANK.

SPECIFICATION forming part of Letters Patent No. 711,281, dated October 14, 1902.

Application filed September 23, 1899. Serial No. 731,500. (No model.)

*To all whom it may concern:*

Be it known that I, GUY BRYAN, a citizen of the United States, residing in the city of St. Louis, State of Missouri, have invented certain new and useful Improvements in a Combined Metallurgic Furnace and Precipitating Water-Tank, of which the following is a specification.

My invention relates to improvements in combining furnaces for the metallurgic treatment of ores, principally of the more volatile metals, with precipitating water-tanks and in improvements in the construction of such tanks, whereby the precipitated substances are at all times accessible for removal.

My invention further relates to the combination of means for cooling the waste gases of a metallurgic furnace while in a descending motion and means whereby the waste gases are repeatedly projected against the surface of the water in the precipitating-tank, the object of this combination being to fully condense the metallic vapors in the waste gases and to precipitate the resulting metallic particles in the water-tank and also to precipitate the lighter particles of oxidized metal before the waste gases are finally expelled in the chimney.

In the accompanying drawings, Figure 1 is a central sectional vertical elevation; Fig. 2, a front elevation with the waste gas and condensing and precipitating apparatus partially in section. Fig. 3 is a horizontal section on line 3 of Figs. 1 and 2. Fig. 4 is a cross-section on line 4 of Fig. 2.

Similar letters refer to similar parts in all the figures.

For the purpose of illustration a blast-furnace with a specific blast-heating arrangement has been selected; but any metallurgic furnace, whether acting with forced or suction draft and cold blast or any manner of heating the blast, may be employed.

The illustration shows a blast-furnace built on a foundation-ring B, Figs. 1 and 2, with drop bottoms B', B being supported by columns c, the latter being fastened to the foundation-plate C. A lining of refractory material is erected within the shell-rings A on the ring B. The furnace is provided with the usual tap-hole, cinder-hole, and twyer-holes and with a door G on the upper part, giving access to the interior when necessary. The furnace charges of fuel, ore, and flux are introduced through the charging-hopper N. The blast passes to the blast-main E and twyers F, Figs. 1, 2, and 3, through a series of horizontal pipe-rings D, bent to the periphery of the furnace, and through the short connecting-tubes d. The pipe D being built in the lining of the furnace, the blast is heated by the radiation from the lining. Near the top or at any convenient height at one side of the furnace is connected the waste-gas exit-flue H. The flue or chimney H' on top of H is normally closed by a cap or valve h, this valve being only opened in case of accidental obstruction of the regular gas-flue or during the time necessary for starting the operation of the furnace. The waste gases of the furnace are normally conducted through the down-flue I to a receiving chamber or compartment J of the water-tank K. The water-jacket $i$, surrounding the flue I for the purpose of cooling the gases therein, is provided with a circulation of cold water through the inlet $i'$ and the outlet or overflow $i''$. However, in the treatment of ores emitting metallic vapors condensible at high temperatures the cooling action of the surrounding atmosphere may be and is generally sufficient for their condensation. In such cases, therefore, the water-jacket may be omitted altogether.

The water-tank K for the reception of the precipitates from the waste gases is divided into a waste-gas-receiving compartment J and into a waste-gas-expelling compartment J' by the sealing-partition $k$. These two waste-gas compartments are separated from the compartments open to atmospheric air, $j$ and $j'$, by the water-sealing partitions $k''$ and $k'$, respectively, Figs. 2 and 4. As these compartments open to atmospheric air are provided for the purpose of withdrawing the precipitate or sediment accumulating at the bottom of the tank K, it is perfectly indifferent how many of these compartment are provided or how they are attached to the tank K, and the only condition which they have to fulfil is to form a means of access to the precipitate or sediment at the bottom of the tank, so that said precipitate may be withdrawn from time to time while the furnace is in operation. Such open compartments may be applied to the ends of K, as shown in Fig. 2, or to the sides, as shown in Fig. 4. Cold water is admitted through an inlet o, and a constant level is maintained by the overflow-opening n.

A large opening l, Figs. 2 and 4, in one of the walls of the waste-gas-receiving compartment is connected by a flue l' to the suction-opening of a fan-blower L, the blast-flue L' being directed so as to discharge the waste gases against the surface of the water in the compartment J', its orifice being not necessarily submerged, as shown.

The down-flue I from the furnace is directly connected to the waste-gas-receiving compartment J, and the waste-gas-expelling compartment is in communication with a chimney M. A circulation of water is maintained in the precipitating water-tank K through the water-inlet o and the overflow n.

In starting operation with the blast-furnace valve h of the flue H' is kept open, while a certain amount of fuel previously introduced in the furnace through the hopper N is lighted and kept burning for the purpose of thoroughly drying the furnace and for heating it to the proper temperature. The necessary air is admitted through the twyer-holes, the twyers being temporarily removed for this purpose. Soon after the first charges of fuel, ore, and flux are fed in the furnace the twyers are replaced, the blowing-machine connected with the upper end of pipe D is started, the fan-blower L is set in motion, and a circulation of cold water in the jacket i is established sufficient to cool the waste gases of the furnace, so that no chemical combination with the water in tank K will take place while the gases are flowing over its surface or while they are driven through it. The valve h of the flue H' is then closed and kept closed during the regular operation of the furnace.

In operating with a blast-furnace the operation of the fan may be dispensed with if the blast is of sufficient pressure to overcome the resistance opposed to the motion of the waste gases, while in operating with any other metallurgic furnace the operation of the fan will create an indraft of air by suction and in this manner act as a substitute for a blowing apparatus.

The result of the arrangement and manner of operating the furnace will be that any fine metallic particles which may be carried over with the current of the gases will be deposited at the bottom of tank K in the compartment J and may be withdrawn through compartment j when necessary; that the lighter particles of oxidized metal or other metallic compounds will be drawn in the fan and together with the waste gases will be violently projected against and through the water in compartment J', the oxids or other solid compounds being thereby retained in the water and gradually precipitated to the bottom of the tank, from which they can from time to time be withdrawn through the open compartment j'; that the waste gases having been sufficiently cooled by the external application of cold water no conversion of sulfurous-acid gases into sulfuric acid will take place, the heat necessary for this reaction being by definition not available. No dissolving action of the metals, their oxids, or other compounds deposited in the tank K not primarily soluble will therefore take place in the water.

What I claim as my invention, and desire to secure by Letters Patent, is—

1. A metallurgic furnace; a condensing down-flue in communication therewith, a precipitating water-tank with the waste-gas-receiving compartment therein, connected to the down-flue, the waste-gas-expelling compartment therein, communicating with a chimney, and a compartment open to atmospheric air, attached to the tank for the withdrawal of the precipitate from the tank; in combination with means for transferring the waste gases from the receiving to the expelling compartment, and with water-sealing partition-walls, dividing the waste-gas compartments from each other, and dividing them from the compartment open to atmospheric air.

2. A metallurgic furnace; a condensing down-flue in communication therewith; a precipitating water-tank with the waste-gas-receiving compartment therein, connected to the down-flue, the waste-gas-expelling compartment therein, communicating with a chimney, and a compartment open to atmospheric air, attached to the tank for the withdrawal of the precipitate from the tank; in combination with a suction and blast fan, its housing, its suction-spout, connected to the waste-gas-receiving, and its blast-spout, connected to the waste-gas-expelling compartment, and with water-sealing partition-walls, dividing the waste-gas compartments from each other, and dividing them from the compartment open to atmospheric air.

3. A metallurgic furnace; a condensing down-flue in communication therewith; a precipitating water-tank with the waste-gas-receiving compartment therein, connected to the down-flue, the waste-gas-expelling compartment therein, communicating with a chimney, and two compartments open to atmospheric air attached to the tank for the withdrawal of the precipitate from the tank, in combination with means for transferring the waste gases from the receiving to the expelling compartment, and with water-sealing partition-walls, dividing the waste-gas compartments from each other and dividing them from the compartments open to atmospheric air.

4. A metallurgic furnace; a condensing down-flue, in communication therewith; a precipitating water-tank with the waste-gas-receiving compartment therein connected to the down-flue, the waste-gas-expelling compartment therein, communicating with a chimney, and two compartments open to atmospheric air attached to the tank for the withdrawal of the precipitate from the tank, in combination with a suction and blast fan, its housing, its suction-spout, connected to the waste-gas-receiving, and its blast-spout connected to the waste-gas-expelling compartment; and water-sealing partition-walls, dividing the waste-gas compartments from each other, and dividing them from the compartments open to atmospheric air.

5. A metallurgic furnace; a water-jacketed down-flue, in communication therewith; a precipitating water-tank with the waste-gas-receiving compartment therein, connected to the down-flue, the waste-gas-expelling compartment therein, communicating with a chimney, and a compartment open to atmospheric air, attached to the tank for the withdrawal of the precipitate from the tank; in combination with means for transferring the waste gases from the receiving to the expelling compartment, and water-sealing partition-walls, dividing the waste-gas compartments from each other, and dividing them from the compartment open to atmospheric air.

6. A metallurgic furnace; a water-jacketed down-flue, in communication therewith; a precipitating water-tank with the waste-gas-receiving compartment therein, connected to the down-flue, the waste-gas-expelling compartment therein, communicating with a chimney, and a compartment open to atmospheric air, attached to the tank for the withdrawal of the precipitate from the tank; in combination with a suction and blast fan, its housing, its suction-spout connected to the waste-gas-receiving, and its blast-spout connected to the waste-gas-expelling compartment; and water-sealing partition-walls, dividing the waste-gas compartments from each other, and dividing them from the compartment open to atmospheric air.

7. A metallurgic furnace; a water-jacketed down-flue in communication therewith; a precipitating-tank with the waste-gas-receiving compartment therein, connected to the down-flue, the waste-gas-expelling compartment therein, communicating with a chimney, and two compartments open to atmospheric air attached to the tank for the withdrawal of the precipitate from the tank, in combination with means for transferring the waste gases from the receiving to the expelling compartment, and water-sealing partition-walls dividing the waste-gas compartments from each other, and dividing them from the compartments open to atmospheric air.

8. A metallurgic furnace; a water-jacketed down-flue, in communication therewith, a precipitating water-tank with the waste-gas-receiving compartment therein, connected to the down-flue, the waste-gas-expelling compartment therein, communicating with a chimney, and two compartments open to atmospheric air attached to the tank for the withdrawal of the precipitate from the tank, in combination with a suction and blast fan, its housing, its suction-spout, connected to the waste-gas-receiving, and its blast-spout connected to the waste-gas-expelling compartment; and water-sealing partition-walls, dividing the waste-gas compartments from each other, and dividing them from the compartments open to atmospheric air.

GUY BRYAN.

Witnesses:
  J. A. BEACH,
  W. E. KELLY.